United States Patent [19]

Todd

[11] Patent Number: 4,623,759

[45] Date of Patent: Nov. 18, 1986

[54] TELEPHONE LINE VOLTAGE ACTUATED SWITCH

[76] Inventor: Leonard M. Todd, 424 W. 119th St., New York, N.Y. 10027

[21] Appl. No.: 9,450

[22] Filed: Feb. 5, 1979

Related U.S. Application Data

[63] Continuation-in-part of Ser. No. 754,829, Dec. 27, 1976, abandoned, which is a continuation-in-part of Ser. No. 401,062, Sep. 26, 1975, Pat. No. 4,017,686, which is a continuation-in-part of Ser. No. 250,068, May 3, 1972, Pat. No. 3,794,767.

[51] Int. Cl.⁴ .............................................. H04M 1/64
[52] U.S. Cl. .................................................... 379/79
[58] Field of Search ................... 179/100.1 R, 100.1 S, 179/6 R, 6 E, 6 C, 6 AC, 100.3 R, 100.4 R, 6.03; 360/61, 55

[56] References Cited

U.S. PATENT DOCUMENTS 3,524,026 8/1970 Langendorf et al. ............... 179/6 E
3,562,441 2/1971 Bretschneider ................. 179/100.15
3,728,489 4/1973 Beacham ............................ 179/6 R Primary Examiner—Robert L. Richardson

[57] ABSTRACT

A voltage actuated switch coupled to a telephone line for actuating a tape recorder or other apparatus with a transistor in series with the apparatus and a power source; a circuit within the switch biases the transistor into conduction when the telephone line voltage is low, "off-hook" causing the tape recorder or apparatus to operate; when the telephone line voltage is high, "on-hook", the circuit biases the transistor off, current ceases to flow to the tape recorder or apparatus that is then turned off.

1 Claim, 19 Drawing Figures

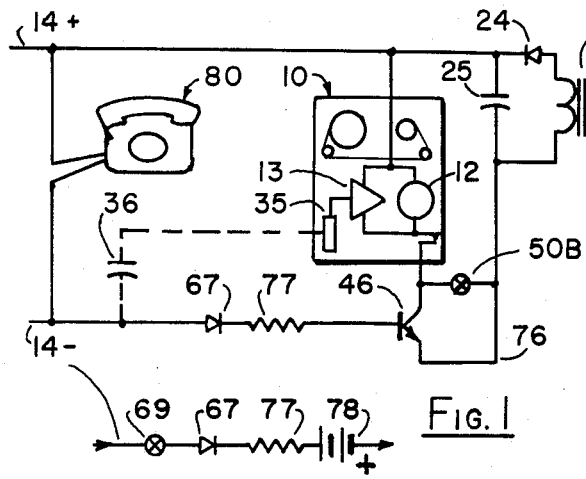
Fig. 1
Fig. 1A
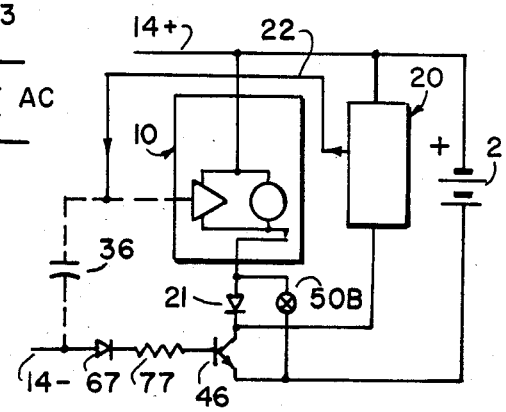
Fig. 1B
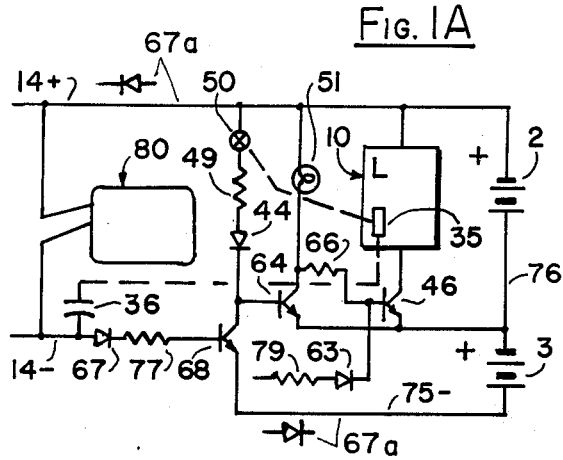
Fig. 2
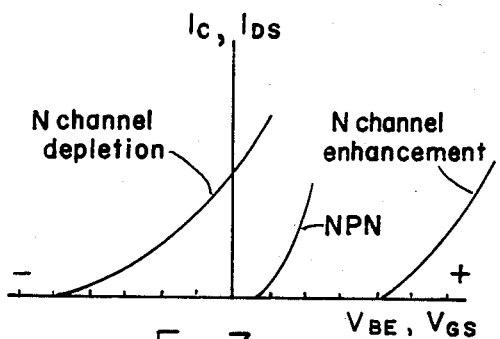
Fig. 3
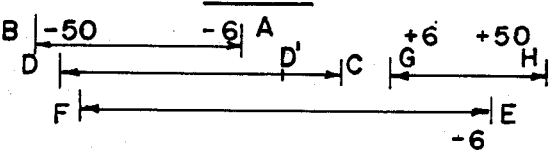
Fig. 3A
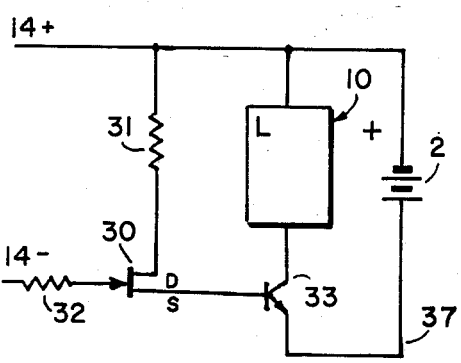
Fig. 5
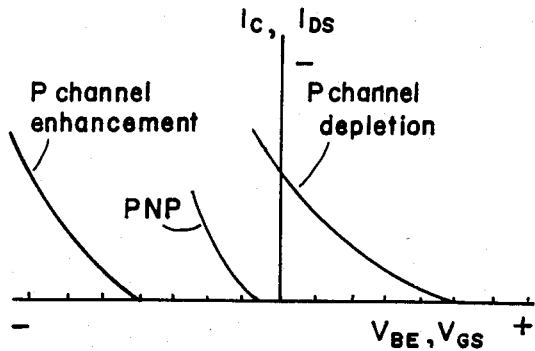
Fig. 4

TELEPHONE LINE VOLTAGE ACTUATED SWITCH

This application is a continuation-in-part of Ser. No. 754,829, filed Dec. 27, 1976 and now abandoned, that is a continuation-in-part of Ser. No. 401,062, filed Sept. 26, 1975, now U.S. Pat. No. 4,017,686 and is filed in addition pursuant to a requirement for restriction in Ser. No. 401,062, that was a continuation-in-part of Ser. No. 250,068, filed May 3, 1972, Control Circuit for Telephone Answering Set, now U.S. Pat. No. 3,794,767, that was filed pursuant to a requirement for restriction in Ser. No. 88,909, filed Nov. 12, 1970, now abandoned. Ser. No. 88,909 was refiled June 28, 1976 as a continuation-in-part, Ser. No. 700,109 and again refiled Jan. 12, 1979 as a continuation-in-part Ser. No. 3235.

BACKGROUND OF THE INVENTION

This invention relates to circuits for actuating apparatus, particularly tape recorders, beep-tone generators, lamps, relays or the like when the high on-hook voltage of the telephone line drops to or near low off-hook voltage, when the customer lifts the handset; in addition, line voltage drops from on-hook during negative swings of ringing voltage. In the prior art, actuation of such equipment was accomplished mainly by series relays energized by off-hook current. It was also accomplished by a relay in parallel with the line that necessarily drew high on-hook current and interfered with service. A vacuum tube was successfully employed for this service with a relay circuit employing two power sources. A transistor circuit to light a supervisory lamp approached this result with an additive voltage power source drawing relatively large amounts of on-hook current and was not set out accurately.

Circuits that actuate recorders in off-hook produce recordings that are more acceptable as legal evidence than those made with voice actuated (VOX) devices since there is no cut off of beginning phrases by circuit delay. This invention draws little or no current in on-hook and does not interfere with telephone service and draws little current in off-hook.

It is an object of this invention to actuate apparatus such as a magnetic tape recorder, principally the motor, or the motor and amplifier with a transistor in series with the apparatus and a power source, that may eliminate a relay, simplifies switching and is especially useful in telephone answering sets and dictating machines, including drum, disc and belt recorders. See U.S. Pat. Nos. 3,794,764 and 3,794,767.

It is an object of this invention to actuate such transistor either directly by the line voltage change or by another semiconductor switch such as an FET or another bipolar transistor, in arrangements that draw little or no current from the telephone line.

It is an object of this invention to increase the control element voltage breakdown (gate-source or base-emitter) by the use of a diode in the control element circuit, or the power circuit.

SUMMARY OF THE INVENTION

Line voltage is on-hook is usually 50 volts and off-hook is 6 volts. During ringing, 60-90 volts 20 Hz AC is applied to the line. In rotary dialing, pulses of 50 volts rising from 6 volts appear. In "touch tone" dialing, superimposed tones appear on the 6 volt off-hook voltage.

A bias voltage is added to the line voltage causing a resultant applied to the control element of a semiconductor whose conducting terminals are in series with the load (tape recorder, for example) and the power source. High on-hook voltage combined with the bias causes a resultant that is well below cut-off, the semiconductor does not conduct and the apparatus does not operate. Low off-hook voltage combined with the bias yields a resultant that is above cut-off, conduction occurs in the semiconductor and the apparatus operates. In some circuits, a diode in series with the control element is back-biased by on-hook voltage and the control element is biased to zero volts in this condition; current drain from the telephone line is in the order of low nanoamperes. In off-hook, the diode is forward biased, conducts and the control element is also forward biased, causing conduction and operation of the apparatus. A relay coil in series with a bias voltage source and a diode aperates similarly; on-hook back biases the diode and off-hook is lower than the voltage source causing forward bias on the diode and current flow in the coil.

In some circuits, resting voltage causes conduction and off-hook voltage causes cut-off. The bias voltage may be furnished by the power source, by a separate source or by both the power source and a separate source in many of the circuits.

BRIEF DESCRIPTION OF THE DRAWINGS

FIG. 1 is a circuit from U.S. Pat. No. 3,794,767 (having continuity with this application) wherein a single transistor is biased to zero volts base to emitter at on-hook using a back biased diode, with both the diode and transistor forward biased by off-hook voltage.

FIG. 1A shows the manner in which additional bias may be added to the power source bias with batteries.

FIG. 1B shows a circuit in which a beep-tone generator or other apparatus may be operated from the semiconductor when actuated by talking voltage and remains inactive when the main load or recorder is used for playback, etc. without complex switching.

FIG. 2 is a circuit similar to FIG. 1 (from FIG. 4 U.S. Pat. No. 3,794,767) employing a higher voltage bias source, intermediate between off-hook and on-hook, to provide for occasional high voltage off-hook condition.

FIG. 3 shows typical transfer characteristic curves for NPN bipolar transistors, N channel depletion and N channel enhancement FET's (unipolar), both junction gate and metal oxide (MOS) semiconductors, with terminal current (collector to emitter or drain to source) plotted against base to emitter voltage or gate to source voltage.

FIG. 3A shows the operating points for the three types of transistors and for inverse operation of an N channel enhancement FET.

FIG. 4 shows corresponding transfer characteristic curves for PNP transistors and P channel FET's.

FIG. 5 is an arrangement whereby an N channel depletion FET actuates a transistor to operate a load with voltage change in the telephone line.

DESCRIPTION

Figure 6:
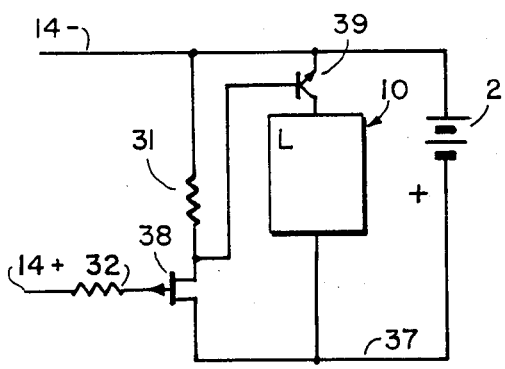
FIG. 6 corresponds to FIG. 5 using a P channel FET.

The basic circuit is shown in FIG. 1 with most of the reference characters corresponding with FIG. 5, U.S. Pat. No. 3,794,767 wherein this invention is shown applied to a telephone answering device. U.S. Pat. No. 3,794,764 shows similar closely related disclosure of this invention. The telephone line voltage, 14+, 14−, is 50 volts on-hook and 6 volts off-hook, that actuates the circuit. In practice, off-hook voltage may rise to 12 volts with high transmitter resistance and with low supply voltage or high line resistance may fall to 4 volts. Transistor 46 collector and emitter, tape recorder 10 amplifier 3 and motor 12 and power supply 23–25 are in series. Batteries 2 may be substituted for 23–25 and by reversing polarity of the diodes of the power supply and in the telephone line, transistor 46 may be replaced with a PNP unit. Only the motor 12 of the recorder need be in series with transistor 46 and amplifier 13 may be on continuously, may be in parallel with the motor or be actuated in a different manner.

When line 14− is −50 volts, diode 67 is reverse biased from line 14+, power source and emitter-base junction of transistor 46. Current flow is in low nanoamperes. Base-emitter voltage is zero, the transistor does not conduct and recorder 10 is off. In off-hook, line 14− is −6 volts. The power supply in this example (FIG. 1) is about 8 volts and line 76 is −8 volts with respect to 14+. The resultant of 6 v. line and 8 v. supply is +2 that forward biases diode 67 and forward biases base-emitter junction of transistor 46 that conducts and operates recorder 10. Resistor 77 is for protection of the base-emitter junction when forward biased.

With the input of amplifier 13 of recorder 10 coupled to the line, by capacitor 36 or otherwise, with the recorder in record condition and actuated by the off-hook condition, communications in the telephone line are recorded. In on-hook, at the conclusion of a conversation, recorder 10 is turned off automatically. The response to a call by an answering service where it is employed, will be automatically recorded. A ring signal in the line will cause conduction intermittently at 20 Hz and may light a lamp or operate a relay in place of recorder 10.

For playback, switch 50B is closed, recorder controls are switched to rewind and then play and the recorded communications may be heard. Switch 50B is readily coupled to record-play switch 35 avoiding an unnecessary operation.

FIG. 1A shows an alternate method of adding bias when recorder 10 is operated on relatively low voltage, say 6 volts or less or when off-hook voltage is relatively high, say 8 volts or more. Batteries 78 may be added to make up the difference and cause a positive differential.

This system is readily adapted to law enforcement wire-tapping. Federal Communications Commission regulations provide for a beep-tone to be employed during recording, that is a 1400 Hz tone lasting 1/5 second, repeated every 12 to 15 seconds at a level about equal to speech. When the recording party notifies the other party that the conversation is being recorded, the beep-tone may possibly be eliminated; care should be taken not to record conversations of which the parties are unaware of the recording, since this is unlawful wiretapping.

In FIG. 1B beep-tone generator 20 is actuated when off-hook voltage causes transistor 46 to conduct. When switch 50B is closed to energize recorder 10 for rewind and playback, diode 21 prevents the beep-tone generator 20 from being actuated by the power supply without the need for complex switching.

A relay coil may be inserted in place of recorder 10, and the relay contacts caused to operate other apparatus or a similar recorder 10, These circuits may be employed to actuate a supervisory lamp as the load that is useful particularly at multi-key telephone sets, to reduce the complexity of existing circuits.

In FIG. 2, battery 3 furnishes additional voltage to cause line 75− to be more negative. With battery 2 (or equivalent AC power supply 23–25) at 8 volts and battery 3 (or equivalent AC power supply) at 10 volts, the total is 18 volts that provides for operation at off-hook up to this value.

Alternate locations of diode 67 are shown in FIG. 2 as 67a. When on-hook voltage is 50 volts, diode 67 and diodes 67a when located as indicated are backward biased and prevent flow from the line through power source 2–3 and emitter-base junction of transistor 68. The emitter-base breakdown voltage of silicon transistors is low, a common value of $BV_{EBO}$ being 5 volts; without the diode, this junction would breakdown and current would flow from the telephone line through the junction and resistor 77 would limit the amount of flow. This is not a desirable condition since telephone line drain, especially in on-hook interferes with service. By the addition of the diode (67 or 67a) with high breakdown voltage—say 100 volts—the effective breakdown voltage of the transistor 68 is thereby raised to this value. This circuit is generally applicable to other situations, where increased breakdown voltage is useful.

When transistor 68 in FIG. 2 is on, in off-hook, collector to emitter drop of 68 goes low, causing base of transistor 64 to go low and cease to conduct. Voltage at collector of transistor 64 goes high and current flows through resistor 66 to base of transistor 46, causing this transistor to conduct and to operate recorder 10 or equivalent load. When line voltage is restored to on-hook by the customer hanging up, the reverse process occurs. Transistor 68 goes off, transistor 64 goes on and transistor 46 goes off, so that recorder 10 does not operate. Switch 69 in FIG. 1A and switch 50 in FIG. 2 are turned off to isolate the circuit from the line and cause the circuit to be unaffected by on-hook or off-hook.

FIG. 3 shows typical transfer characteristic curves of N channel depletion and N channel enhancement FET's, both junction gate and metal oxide semiconductors (MOS)(unipolar) and NPN (bipolar) at selected collector to emitter voltage or base current and for the FET's at selected load and drain to source voltage. In both the enhancement FET and bipolar transistor, there is no conduction at zero bias, the FET gate must be forward biased to produce carriers for conduction to occur. In the transistor, the base to emitter junction must be forward biased for collector-emitter conduction. Transistors start to conduct at from 0.06 to 0.8 volts (0.5–0.8 for silicon) base-emitter bias. The depletion J-FET, more common, conducts at zero bias and the gate to channel structure is a p-n junction. Reverse bias induces a charge to reduce channel current. At forward bias (above zero), the p-n junction conducts and power gain diminishes. MOSFET gates are insulated from the channel structure and do not conduct at forward bias, in both depletion and enhancement types.

Enhancement FET's and transistors are similar in requiring forward bias to start conduction.

In FIG. 4 are the transfer characteristic curves for P channel depletion, P channel enhancement FET's and PNP transistors, comparable to the curves of FIG. 3 except for reverse polarity. In both FIGS. 3 and 4, abscissa axis is bias with origin zero, and ordinate axis is terminal current flow, collector to emitter or drain to source, with origin zero.

In FIG. 3A under the abscissa axis are examples of the operating points, −50 v. off-hook and −6 v. off-hook added to bias to produce the resultant applied to the control element. Points B, D and F are in cut-off and points A, C and E are in conduction for the three types of units. Point D' is zero bias for the NPN transistor at cut-off with a series diode bucking the resting voltage as in FIGS. 1–2. Points G and H result from adding a positive bias to N channel enhancement gate, causing inverse operation described in FIG. 8.

Similar operating points are determined by this procedure for FIG. 4 P channel FET's, PNP transistors and Darlington PNP transistors.

The operating base-emitter cut-off voltage of a Darlington transistor pair is about 0.25 volts (typically) higher than for one transistor and the same voltage is 0.25 volts higher again for a three transistor Darlington. Transfer curves are progressively steeper reflecting the higher gain of the Darlington arrangements and the lower base current.

In FIG. 5, battery 2 may be in the order of 6 volts suitable for many recorders and gate resistor 32 may be in the order of 10 to 100 megohms, causing telephone line current in on-hook to be a fraction of a microampere. Operating points are given in FIG. 3A; at point B, on-hook, FET 30 is biased well into cut-off, no current flows from drain to source and the base-emitter junction of transistor 33 is not forward biased. Load 10 is therefore off. At point A, off-hook, 6 volts, with an operating drop at base-emitter of transistor 33 about 0.8 volts, the source of FET 30 is then −5.2 v. to line 14 and gate to source is −6 minus −5.2=−0.8 v. well into the conduction region. FET 30, base-emitter of transistor 33 and the transistor conduct and load 10 operates. In on-hook, the FET and transistor are biased off and load 10 goes off. By suitable choice of FET's with cut-off at higher values, to say 6 volts, this circuit will operate the load with off-hook voltages to 12 volts. While little current capacity is had in FET's, a sensitive relay in place of resistor 31 with source returned to battery 2 negative or similarly substituted in FIG. 6 will operate and the contacts employed to actuate other equipment.

It is noted that on-hook voltage −50, exceeds ($V_{(br)gss}$ of most FET's that normally ranges from 20 to 30 volts. While 50 v. units are available, they are more costly and safety of operation is borderline. Resistor 32 (FIGS. 5–6) serves to limit breakdown current flow for safe operation and this problem is treated further herein.

The operation of FIG. 6 is similar to FIG. 5. In FIGS. 5–6, bias batteries may be added in the gate-telephone line in the manner of FIG. 1A, or in the circuit of FIG. 2 or other expedients may be used. It is seen that depletion FET's provide a greater useful bias range than enhancement FET's or transistors.

In the use of MOSFET's, precautions should be taken to prevent static charges from causing damage; high resistance connections from gate to source or drain are useful. J-FET's are inherently less fragile.

Figure 7:
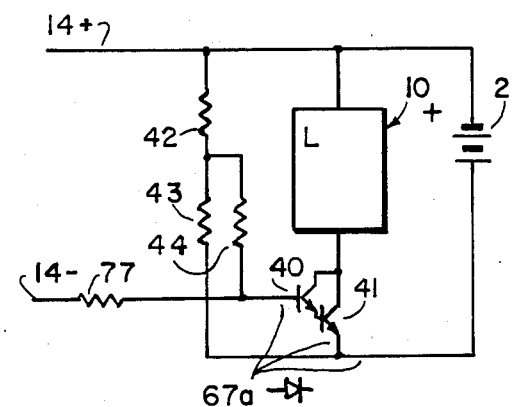
FIG. 7 shows a Darlington transistor backward biased by resting voltage and forward biased by talking voltage.
Figure 9:
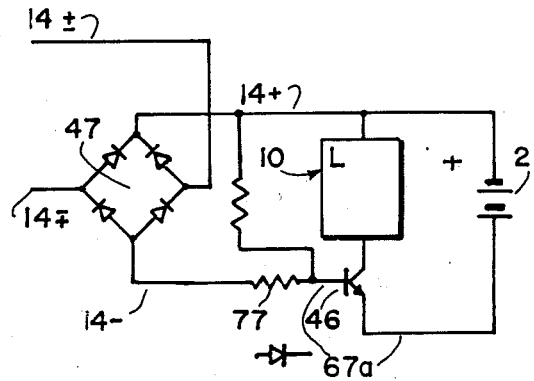
FIG. 9 shows a bridge rectifier input to enable connection to the telephone line without regard to polarity.

FIG. 7 is similar to FIG. 1 with the removal of diode 67 permitting operation at off-hook a few volts higher than power source 2, and on-hook drain around 20 microamperes. Darlington transistor 40-41 is forward biased by network 42-44. The insertion of diode 67a from immediately before base of 40 to emitter of 41 to juncture of power source 2 and load 10 reduces on-hook drain by half since base-emitter breakdown is a major source of leakage in FIGS. 7 and 9. On-hook drain is reduced as $h_{FE}$ is increased. FIG. 9 is similar with a simplified bias network and may employ a Darlington pair.

Figure 8:
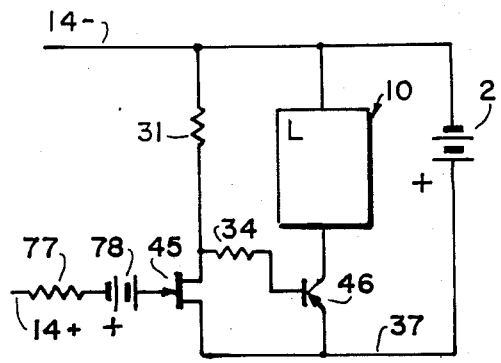
FIG. 8 shows a circuit for inverse operation with the semiconductor normally on with on-hook voltage and off with off-hook voltage.

In FIG. 8, an inverse operating circuit is shown with an N channel FET 45 normally on during on-hook and biased off in off-hook. While extremely small current is required to maintain the FET in conduction with virtually no telephone line drain, a disadvantage is had when batteries are the power source and constant flow in on-hook occurs through resistor 31 and drain to source of FET 45.

Figure 10:
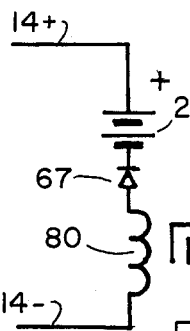
FIG. 10 is a basic form of this invention including an intermediate voltage source opposing the telephone line voltage, a diode to cause zero current flow in on-hook and a relay that is current actuated in off-hook.

FIG. 9 is similar to FIG. 7 with bridge rectifier 47 on the input to permit connection to the telephone line without regard to polarity FIG. 10 is a circuit illustrating one of the principles of this invention and is useful at least because of its simplicity. Diode 67 is backward biased by on-hook voltage that is greater than the opposing voltage of source 2; in this condition no current flows through relay 80. In off-hook, line voltage is lower than the opposing voltage of source 2 (example: source 2 voltage 9 volts; off-hook 6 volts) and the resultant causes a current flow from source 2 through the line 14+,14−, through coil 80 that is then energized and through diode 67 back to source 2.

Figure 11:
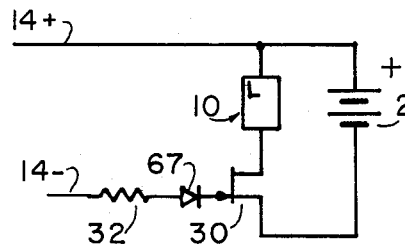
FIG. 11 is an improved form of the circuit of FIG. 5 wherein the diode is employed to increase the effective source to gate breakdown voltage of the J-FET.

In FIG. 11, the circuit is similar to FIG. 5 with the addition of diode 67 that serves to increase the effective $V_{(br)gss}$ of FET 30 to the breakdown voltage of the diode that may be very high. This is discussed above in connection with diodes 67 and 67a in FIG. 2. Resistor 32 (also discussed with description of FIGS. 5–6) serves to limit current to a safe value in the absence of diode 67 or should the telephone line be accidentally connected in reverse polarity.

Since diode 67 does not break down in on-hook, current drain from the telephone line is extremely small, in the low nanoamperes that is far lower than the drain in FIGS. 5–6. As with the diodes 67 and 67a in FIG. 2, the addition of diode 67 to an FET gate input circuit as in FIG. 11 is generally applicable to FET circuits to increase effective $V_{(br)gss}$ to very high values and these circuits may be employed in other applications, both for amplification and switching.

Figure 12:
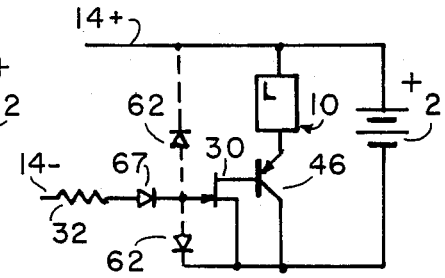
FIG. 12 is a form of FIG. 11 with the J-FET actuating a transistor and an additional diode serving as a voltage divider.

FIG. 12 is similar to FIG. 5 and FIG. 11, employing the principles of opposing power source voltage to telephone line voltage, a J-FET to increase the effective value of turn-on off-hook voltage, diode 67 to increase gate-source breakdown voltage and reduce on-hook leakage and the manner of connection of the J-FET to transistor 46 is improved. A further modification that is shown in FIG. 12 is the optional use of diodes 62 in either of the positions shown. These are back biased by on-hook (62 and 67) so that the voltage appearing across either diode 62 and consequently from gate to source of J-FET 30 is a fraction of the normal 50 v. on-hook as a consequence of 62 and 67 functioning as a voltage divider. A back biased diode has a resistance of several thousand megohms reducing gate-source voltage in on-hook to say 25 volts and in off-hook to 3 volts (instead of 50 and 6 respectively) that is more within the range of available J-FET's and at the same time providing a high resistance source.

Figure 13:
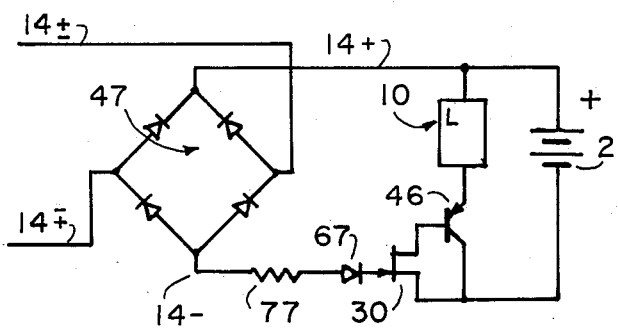
FIG. 13 is a circuit adapted to bridge input.

In FIG. 13 as well as FIGS. 5, 6, 11 and 12 there are two groups of off-hook conditions of interest. The J-FET is chosen to conduct in both off-hook cases. In case 1, off-hook voltage is greater than source voltage 2, say 10 v. and 8 v. respectively and case 2 when off-hook is smaller than source voltage 2, say 6 v. and 8 v. respectively.

In case 2 for FIGS. 5, 6, 11 and 12, the difference voltage is +2 v. applied to diode 67 and gate-source of the J-FET that are forward biased and gate current is limited by resistor 32 or 77 to a moderate, safe value. In case 2 for FIG. 13 and case 1 for all figures, backward biased junctions limit current to extremely low levels. In on-hook, diode 67 and FET gate are backward biased in all cases, also limiting current to extremely low levels.

Figure 14:
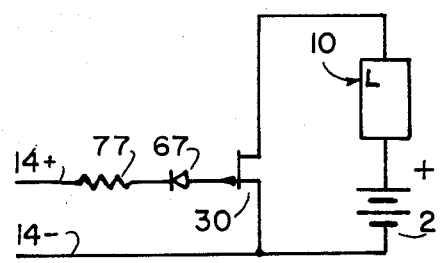
FIG. 14 is a P channel FET circuit wherein the FET has relatively high cut-off voltage.
Figure 16:
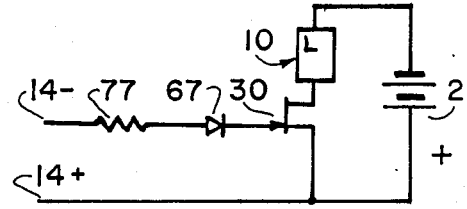
FIG. 16 is similar to FIG. 14 with an N channel J-FET.

FIG. 14 shows a P channel J-FET circuit that will conduct below off-hook of 8 volts with 6 volt source 2. FIG. 16 is similar with an N channel J-FET. Power source and load may be interchanged maintaining current flow in the direction shown since current flow augments bias. Reversing the direction of current flow sharply reduces off-hook conduction voltage to around 3 volts. N and P channel J-FET's may be selected with $v_{gs(off)}$ as high as 9 volts that increase off-hook conduction voltage and such units may be used to advantage also in FIGS. 5, 6 and 11-13. Since the gate junction is always reverse biased, resistor 77 serves only to protect against accidental reversal of polarity of the line.

Figure 15:
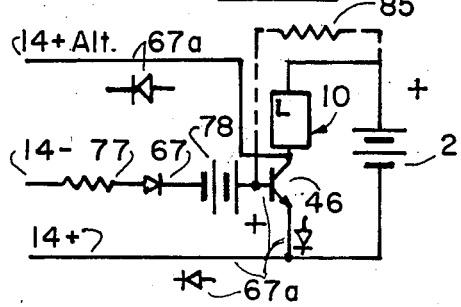
FIG. 15 is a circuit employing separate line voltage opposing bias and a diode to increase base-emitter reverse breakdown voltage and reduce on-hook current to zero.

This principle is shown somewhat modified in FIG. 15 wherein separate bias is employed in the base-emitter circuit of transistor 46. In the same manner as the diodes 67a could be inserted at any point in the base-emitter— power source—telephone line circuit in FIG. 2, the same may be done in this case in the base-emitter—telephone line circuit. With the omission of the diode 67 or 67a, substantial current is drawn from the line in on-hook and the circuit then resembles FIG. 7.

FIG. 16 is similar to FIG. 14 except for the use of an N channel J-FET.

Figure 17:
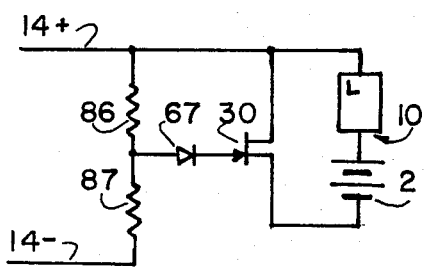
FIG. 17 is a J-FET circuit with a high resistance voltage divider to cause on-hook and off-hook resultants to fall within the FET operating range.

In FIG. 17, the voltage divider 86-87 reduces the on-hook-off-hook range to the limits of usual J-FET's. While a 200,000 ohm load is generally permitted at a line termination, the divider is preferably in the order of 10 to 40 megohms where conventional resistors are used. Diode 67 serves as before to increase the gate-source breakdown voltage. Backward biased diodes that have extremely high resistance may be substituted for the divider 86-87. Applicable to most circuits herein.

The use of the transistor as a switch for a tape recorder as shown in FIGS. 1, 1B and 2 is exceptionally useful (transistor 46, tape recorder 10 and power source 2 or 23-25). This has not been taught or disclosed before when used in a telephone answering set as disclosed in FIGS. 2-5 and 7 of U.S. Pat. No. 3,794,767 and results in exceptional simplification of the circuit. See also FIGS. 2-11 of U.S. Pat. No. 3,794,764.

The FIG. 8 circuit will operate an NPN transistor 46 with FET terminals connected to base and collector so that 46 and load 10 will be normally on in on-hook. Resistors 31 and 34 may be deleted. The circuits of FIGS. 14 and 16 may be applied to this circuit, both as shown (with proper polarity) and with a succeeding transistor 46.

The voltage divider 86-87 of FIG. 17 is readily added to the FIGS. 11-13 circuits, across the telephone line with one output terminal of the divider connected to gate of FET 30 and the other output terminal connected to one terminal of the power source. The voltage divider may precede or follow the bridge rectifier as in FIG. 13. In FIG. 13, current flows from telephone line 14+, 14− from on-hook to zero bias through forward biased diodes of bridge 47 and through reverse biased gate-source junction of FET 30 and reverse biased diode 67 in the order of nanoamperes. Should voltage source 2 exceed off-hook telephone line voltage, bridge 47 diodes will be backward biased.

FIGS. 5-6 and 11-13 are uncomplicated and preferred, operating with source 2 that is from 3 to 5 volts lower than off-hook, particularly useful in miniature recorders with source 2 of 3 volts. Similarly, these circuits will operate at relatively high off-hook, say 10 v. with 6 volt power source 2, with zero line drain.

In FIGS. 11, 12, 14, 16 and 17, a succeeding transistor may be added as indicated in FIGS. 5, 6, 8, 12 and 13 wherein the transistor is actuated by the FET.

In FIG. 15, a number of variations is possible; in each, one conductor of the telephone line is connected to base and the other conductor is connected either to the emitter or collector of transistor 46. With bias source 78 in place and diode 67 omitted, these circuits will function as FIG. 1 with diode 67 omitted. With diode 67 inserted in the base-emitter or collector-base circuit, zero on-hook drain results as in FIG. 1.

With bias source 78 deleted, diode 67 inserted in the base-emitter or collector-base circuit and with bias resistor 85 added (from battery or collector to line to base), these circuits operate. In the 14+, Alt. connection to collector, a relatively large voltage differential is required between power source 2 voltage and off-hook voltage, and collector-base drop and transistor dissipation are high.

The base-emitter and collector-base circuits are alternates to the preferred circuits above.

In FIGS. 1-2, the insertion of diode 67 in either input conductor 14+ or 14− in opposition to the normal base-emitter current flow of transistor 67 increases the reverse breakdown voltage of base-emitter junction of transistors 46 or 68 by the reverse breakdown voltage of the diode. This is a very useful characteristic and may also be accomplished by insertion of diode 67a in the power circuit consisting of power source 2 or 2 and 3, load impedance 49 and transistor 68 in FIG. 2, in the normal direction of flow. The circuit is additionally applicable to transistor circuits wherein input conductors 14+ and 14— may be energized from other sources, with the result that a reverse bias applied to the input conductors may rise to a very high value of voltage without causing damage to the transistor or its circuit.

It is also shown that J-FET's that generally have low reverse breakdown voltages from gate to source or drain, $V_{(br)gss}$, may employ this circuit by the insertion of a diode in series with the gate in the direction of flow into the gate. The diode may also be inserted in the load impedance, drain and source, and power source circuit to similarly increase effective $V_{(br)gss}$ and to reduce gate leakage current.

The circuits of these figures that employ a diode immediately adjacent to base or emitter or collector in a bipolar transistor or gate, drain or source in a J-FET (junction field effect transistor) may be conviently encapsulated within a common housing to achieve these results of increased control element breakdown voltage in order to reduce component size and count. The principle may likewise be applied to more complex integrated circuits.

FIG. 15 notes the manner in which one input conductor may be connected to the base of the transistor with a second input conductor connected to other points in the series power circuit.

Other methods may be employed to couple the telephone line to a transistor to actuate it and operate the recorder in series with it and this invention resides in the switching of recorder 10 on and off with a small voltage and low power applied to the control elements of transistor 46 in a simple, convenient circuit. Another method of coupling the line to the transistor, although used to actuate a "supervisory" lamp and requiring alterations to make the circuit operational for the disclosed purpose, is seen in Rice et al. U.S. Pat. No. 3,567,867.

Among the other methods of coupling the telephone line to transistor 46 are those shown in FIGS. 5–9 and 11–17. While FIGS. 11, 14, 16 and 17 show J-FET 30 in series with load L, these circuits may be employed to actuate succeeding transistor 46 as in FIGS. 12–13. In FIGS. 14, 16–17, J-FET 30 may be connected to transistor 46 and to recorder 10 with only two leads from the transistor to the recorder and its power source instead of the three leads in the other figures, simplifying recorder connection.

The principles of this invention include (1) a power source opposing telephone line voltage to reduce on-hook line leakage; (2) insertion of a diode in the new circuits, the prior art circuits and alternates to reduce on-hook line leakage to relatively low levels or to zero, at least by increasing effective base-emitter or gate-source breakdown voltage; (3) the use of FET's to enable these circuits to operate at power source voltages lower than off-hook with zero on-hook drain; and (4) the operation of magnetic sound recorders and their motors in particular, by a transistor.

Where NPN transistors or N channel J-FET's are shown, by proper change in polarity of telephone line, power source, bias source or diode, PNP transistors or P channel J-FET's may be substituted.

The term "semiconductor" may include transistor equivalents such as Darlington transistors, FET's coupled to transistors, FET's, complementary transistors, quasi-complementary transistors (two transistors of like polarity in series: emitter to collector), operational amplifiers, CMOS transistors and the like without departing from the spirit and the principles of this invention. "Transistor" may include Darlington transistors. Equivalent common base and common collector circuits are possible in addition to the common emitter circuits shown. Where "FET" is noted it may be considered to actuate a succeeding transistor.

The term "tape recorder" in the claims includes magnetic sound recorders generally, including data recorders and drum, disk, belt and wire magnetic sound recorders. The amplifier may be in parallel with the motor of the recorders or be separately actuated.

The term "coupling means" for connecting the telephone line to the transistor, power source, recorder motor circuit means an arrangement to convert telephone line on-hook and off-hook voltages to voltages suitable for on-off actuation of the transistor, while providing a minimum disturbance to the telephone line and without materially interfering with service. These are described in the figures and specification and are not limited thereto.

Where a bridge rectifier or voltage divider from the telephone line is connected to a switch circuit herein, the terms "first and second conductor" will refer to the output of the bridge rectifier or voltage divider.

I claim:

1. A voltage actuated switch for a telephone line having first and second conductors and high on-hook and low off-hook voltages comprising a transistor having a base, emitter and collector, a tape recorder having a motor and a recording head and a power source, said transistor going into conduction when a control voltage applied to said base with respect to said emitter is higher than a cut-off voltage, said transistor ceasing to conduct when a control voltage applied to said base with respect to said emitter is lower than said cut-off voltage, coupling means to connect audio voltage in said telephone line to said recording head, said motor, said collector, said emitter and said power source connected in a series circuit, second coupling means having an input and an output, said first and second conductors connected to said input of said second coupling means, said output of said second coupling means connected to said base and a point in said series circuit, said off-hook voltage appearing in said first and second conductors, a voltage thereupon appearing in said output of said second coupling means, said voltage resulting in a base-emitter voltage above cut-off, said transistor conducting, current flowing from said power source through said collector and said emitter and said motor, operating said recorder, said audio voltage coupled to said recording head and being recorded by said recorder; said on-hook voltage appearing in said first and second conductors, a voltage thereupon appearing in said output of said second coupling means, said voltage resulting in a base-emitter voltage below cut-off, said transistor ceasing to conduct, said motor and said tape recorder ceasing to operate.

* * * * *